(12) United States Patent
Stevenson

(10) Patent No.: US 6,170,788 B1
(45) Date of Patent: Jan. 9, 2001

(54) MELON STAND

(75) Inventor: Robert B. Stevenson, Pomona, CA (US)

(73) Assignee: F-D-S Manufacturing Company, Inc., Pomona, CA (US)

( * ) Notice: Under 35 U.S.C. 154(b), the term of this patent shall be extended for 0 days.

(21) Appl. No.: 09/060,116

(22) Filed: Apr. 14, 1998

(51) Int. Cl.$^7$ ............................. A47B 91/00; A01G 29/00
(52) U.S. Cl. ....................... 248/346.01; 248/153; 47/48.5
(58) Field of Search ........................ 248/346.01, 346.11, 248/346.4, 346.5, 903, 176.1, 153, 146, 524; 47/65.5, 71, 39, 904; 220/628, 574

(56) References Cited

U.S. PATENT DOCUMENTS

| | | | |
|---|---|---|---|
| 460,832 | * 10/1891 | Powell | 248/153 |
| 1,688,846 | * 10/1928 | Andrews | 210/464 |
| 2,634,070 | * 4/1953 | Aguettaz | 248/524 |
| 3,109,258 | * 11/1963 | Jensen | 47/48.5 |
| 3,393,892 | * 7/1968 | Buck | 248/346.11 |
| 4,040,461 | * 8/1977 | Cardon | 206/515 |
| 4,204,367 | * 5/1980 | Cone | 47/71 |
| 4,506,799 | * 3/1985 | Mason, Jr. | 220/628 |
| 4,827,638 | * 5/1989 | Peters | 38/102.2 |

* cited by examiner

Primary Examiner—Anita M. King
(74) Attorney, Agent, or Firm—Pretty & Schroeder, P.C.

(57) ABSTRACT

A stand for supporting a melon or the like in a field, and including a lower ring, an upper ring, a plurality of ribs between the upper and lower rings positioning the upper ring above the lower ring, and a support carried on the upper ring for supporting a product on the stand. The support includes a concave platform attached to the upper ring, with the rings, ribs and support formed as a single unit. Preferably the support includes a plurality of radial arms having inner and outer ends and joined together at the inner ends and joined to the upper ring at the outer ends, with a cruciform member fixed to the underside of selected ones of the arms, and a second upper ring positioned concentrically within the one upper ring and affixed to the radial arms.

13 Claims, 4 Drawing Sheets

MELON STAND

BACKGROUND OF THE INVENTION

This invention relates to a new stand for use in growing melons and the like on farms. A growing melon rests on the ground and tends to develop mold and rot at the area of the melon in contact with the ground. The presence of mold, rot or discoloration of the melon significantly reduces the selling price of the product.

The melon most affected by moisture and rot is the cantaloupe due to its natural multiple growths of skin, cracking, and new growth of underskin. This skin configuration is called webbing. The rot particularly forms in the webbing.

This mold is a special problem in many modern day farms where the ground is covered with plastic sheeting to reduce the growth of weeds. Water has a tendency to collect on the plastic, creating an increased likelihood of development of mold and rot on the product. To prevent mold, rot and discoloration, water must be drained away from the melon and the lower melon surface should be ventilated.

In the past, some melon farmers have attempted to solve the problem by placing the melon on a leaf, a dirt clod, some wood shavings, or even on a piece of paper to keep the melon off of the plastic film. Sometimes, the melons are turned a ¼ turn every week or so to present a different surface to the ground. This is very labor intensive. However, none of these methods are satisfactory and they seldom prevent the rot and mold because the melon molds and rots relatively quickly when it comes into direct contact with the plastic or the dirt in the field.

It is an object of the present invention to provide a new product in the form of a melon stand which will maintain the growing melon out of contact with the earth and the plastic sheeting. Another object is to keep water from collecting around the melon skin and allow ventilation to the underside of the melon adjacent the earth or plastic film. It is a particular object of the invention to provide such a stand which is simple in design, easy to utilize in the field, and inexpensive, because the stands typically are thrown away with the plastic sheeting after harvesting the product.

Other objects, advantages, features and results will more fully appear in the course of the following description.

SUMMARY OF THE INVENTION

The stand of the present invention provides for supporting a melon or the like in a field, with the melon spaced above the ground. The preferred form of the stand includes a lower ring, an upper ring, a plurality of ribs between the upper and lower ring, positioning the upper ring above the lower rings, and support means carried on the upper ring for supporting a product on the stand.

Preferably the support means includes a platform attached to the upper ring, with the platform being concave and with the rings, ribs and support means formed as a single unit.

Desirably the stand support means includes a plurality of radial arms having inner and outer ends and joined together at the inner ends and joined to the upper ring at the outer ends, with the support means further including a cruciform member fixed to the underside of selected ones of the arms, and with the support means further including a second upper ring positioned concentrically within the one upper ring and affixed to the radial arms.

Desirably the support means is concave and the rings, ribs and support means are formed as a single unit. The lower ring has an outwardly projecting flange at the lower edge of the lower ring and the upper ring has an inwardly projecting flange at the inner edge of the upper ring, with the upper ring, selected ones of the ribs and corresponding ones of the arms are joined together forming selected inner corners, and including fillets at the selected inner corners.

DESCRIPTION OF THE PREFERRED EMBODIMENT

Figure 1:
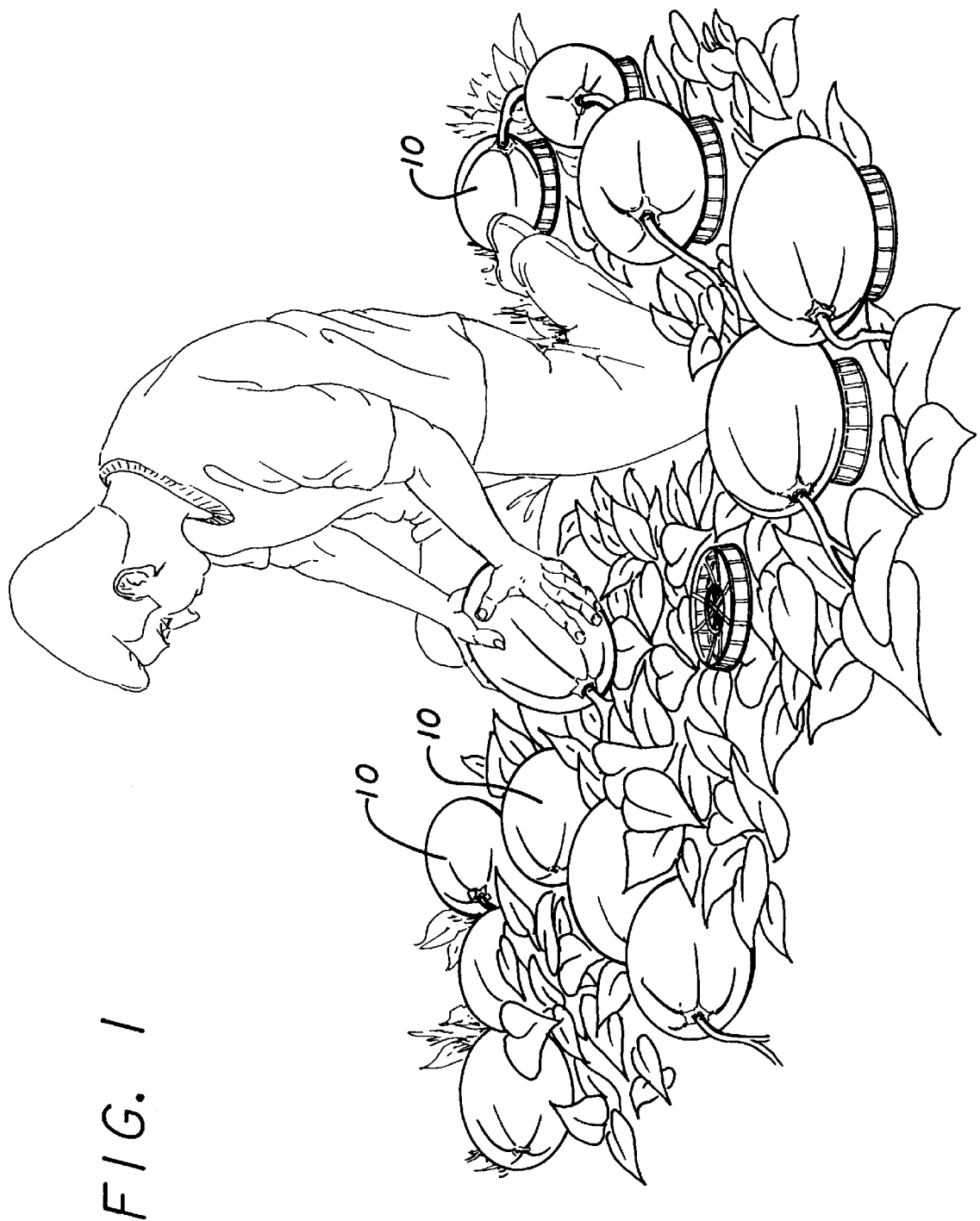
FIG. 1 view of a crop of melons in a field, with individual melons being placed on the stand of the present invention.
Figure 2:
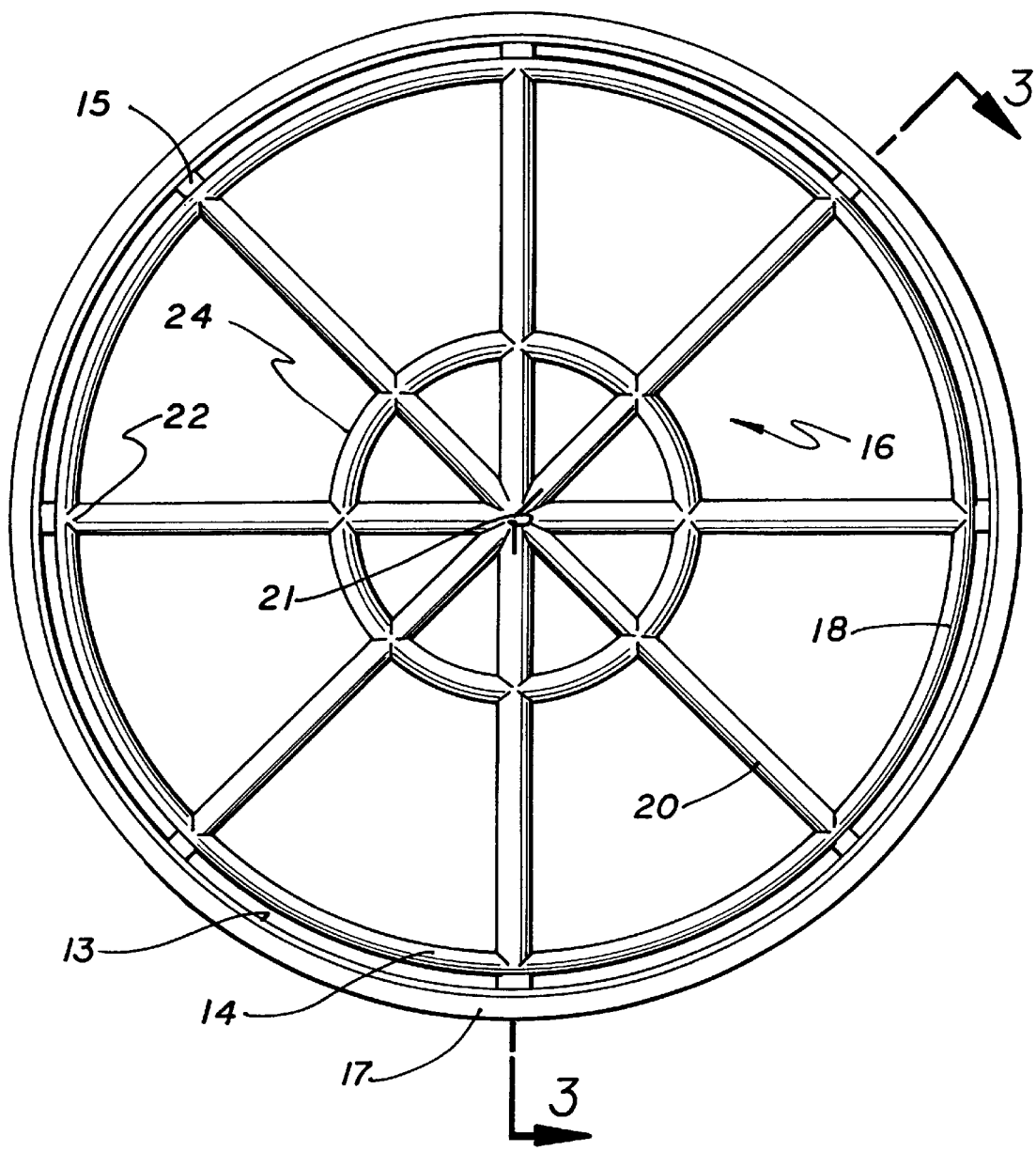
FIG. 2 is a top view of the stand of the invention.
Figure 3:
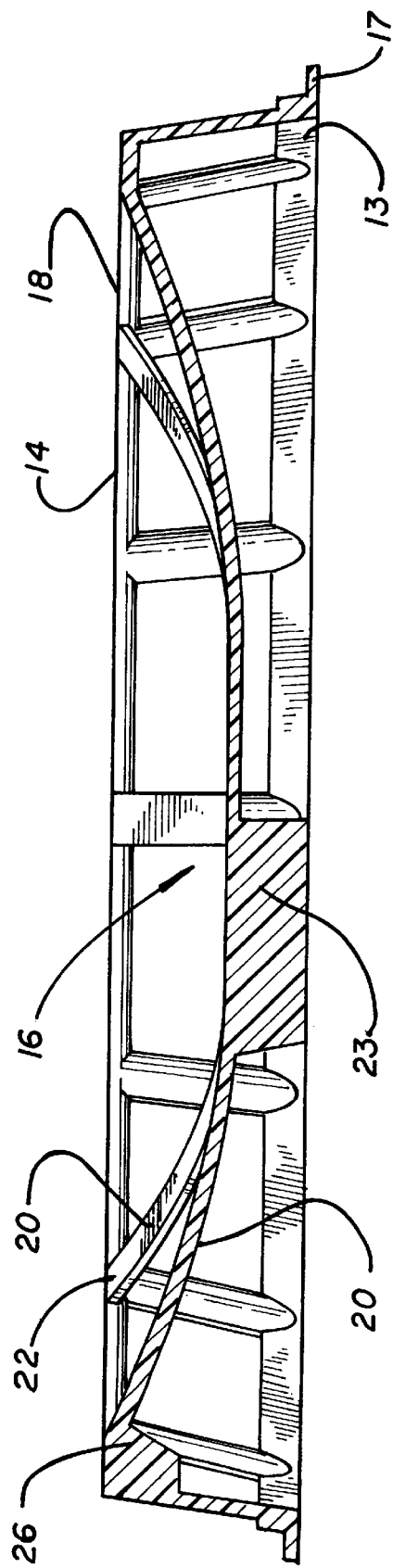
FIG. 3 is an enlarged sectional view taken along the line 3—3 of FIG. 2.
Figure 4:
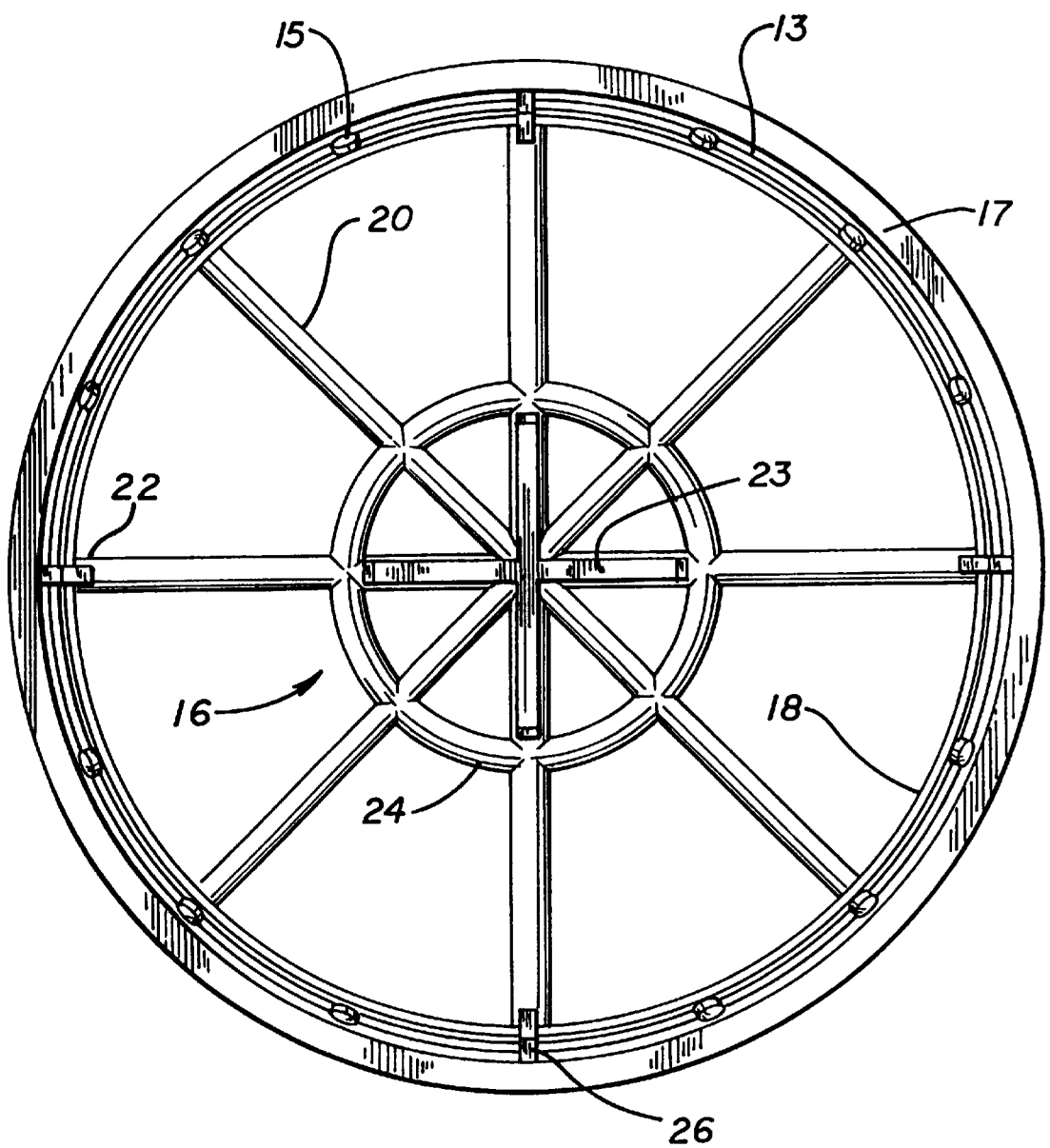
FIG. 4 is a bottom view of the stand of the invention.

The melon stand of the present invention may be used for supporting melons, cantaloupes, pumpkins, squash and various other types of heavy, vine-grown produce which usually lie in contact with the ground while they are growing. With reference to FIG. 1, a crop of melons 10 are shown supported by an embodiment of the melon stand of the present invention. As shown in FIGS. 2–4, the preferred embodiment includes a lower ring 13, and upper ring 14, and a plurality of ribs 15 positioned between the upper and lower rings to maintain the upper ring above the lower ring. Preferably, the plurality of ribs are spaced far apart from one another to allow airflow through the openings formed by the plurality of ribs and the upper and lower rings.

A support means, typically a platform 16, is carried on the upper ring 14 for supporting the product on the stand and spaced above the ground or plastic on which the lower ring rests.

In the preferred construction, the lower ring 13 has an outwardly projecting flange 17 at its lower edge, and the upper ring 14 has an inwardly projecting flange 18 at its upper edge.

The platform includes a plurality of radial arms 20 which are joined together at the inner ends 21 of the arms and which are joined to the upper ring 14 at the outer ends 22 of the arms. The arms 20 can have rounded convex upper surfaces that make it difficult for water to collect on the arms thus helping to prevent mold or rot from forming on the melons.

Desirably a cruciform member 23 is fixed to the underside of selected arms. A second upper ring 24 is positioned concentrically within the upper ring 14 and fixed to the radial arms 20. The cruciform member 23 and the second upper ring 24 provide additional structural support for the melon and maintain the lower surface of the melon spaced from the field.

The cruciform member 23 under the selected arms is designed to support melons up to about five pounds. In the illustrated embodiment, the cruciform member 23 includes four thin, elongated, substantially rectangular members, joined at their one end to form a cross and set on their lower edge to raise the melon from the earth or plastic film so as to not block ventilation to the base of the melon.

Desirably a fillet 26 is positioned at the junctions of the upper ring, ribs and corresponding arms. In the presently preferred embodiment illustrated, the fillets 26 are provided at the arms which are attached to the cruciform member 23. Also in the preferred embodiment, the platform has a concave configuration, as best seen in FIG. 3.

These fillets are stacking lugs to allow multiple stands to be stacked in a column for shipment or carrying in the field. These lugs keep the stands at a fixed distance from the next one allowing for easy denesting.

The construction of the stand is readily adapted for manufacture as a single unit, preferably by plastic injection molding. With this deign, the stands can be produced rapidly and at very low cost, providing a throw away item which resolves the problem of protecting the melons from rot and mold.

I claim:

1. A stand for supporting a piece of produce said stand including:

a lower ring;

an upper ring;

a plurality of ribs between said upper and lower rings positioning said upper ring above said lower ring; and a support means carried on said upper ring for supporting the piece of produce on said stand;

wherein said support means includes a plurality of radial arms having inner and outer ends and joined together at said inner ends and joined to said upper ring at said outer ends.

2. A stand as defined in claim 1 wherein said support means further includes a cruciform member fixed to the underside of selected ones of said arms.

3. A stand as defined in claim 2 wherein:

the cruciform includes a cross point; and the cross point is positioned at the radial center of the support means to further support the weight of the piece of produce.

4. A stand as defined in claim 2 wherein the cruciform member includes four thin, elongated substantially rectangular members joined at their one end to form a cross and set on their lower edge to raise the piece of produce from the earth or plastic film so as to not block ventilation to the base of the piece of produce.

5. A stand as defined in claim 1 wherein each of the plurality of radial arms has a rounded upper surface.

6. A stand as defined in claim 1 wherein the rounded upper surfaces have a convex shape that makes it difficult for water to collect on the arms.

7. A stand as defined in claim 1 wherein said support means further includes a second upper ring positioned concentrically within said one upper ring and affixed to said radial arms.

8. A stand as defined in claim 1 wherein said support means is concave.

9. A stand as defined in claim 1 wherein said rings, ribs and support means are formed as a single unit.

10. A stand as defined in claim 1 wherein:

said lower ring has an outwardly projecting flange at the lower edge of said lower ring; and said upper ring has an inwardly projecting flange at the inner edge of said upper ring.

11. A stand as defined in claim 1 wherein said upper ring, selected ones of said ribs and corresponding ones of said arms are joined together forming selected inner comers, and including fillets at said selected inner corners.

12. A stand as defined in claim 1 wherein the cruciform member can support the piece of produce, wherein said piece of produce weighs up to about five pounds.

13. A stand for supporting a piece of produce, said stand including:

a lower ring;

an upper ring;

a plurality of ribs between said upper and lower rings positioning said upper ring above said lower ring;

support means carried on said upper ring for supporting the piece of produce on said stand, without puncturing, scraping, cutting, or otherwise damaging the piece of produce; wherein the support means holds the piece of produce above and spaced from a field in which it is growing, as the piece of produce grows from bud to maturity.

\* \* \* \* \*